Figures 1, 2:
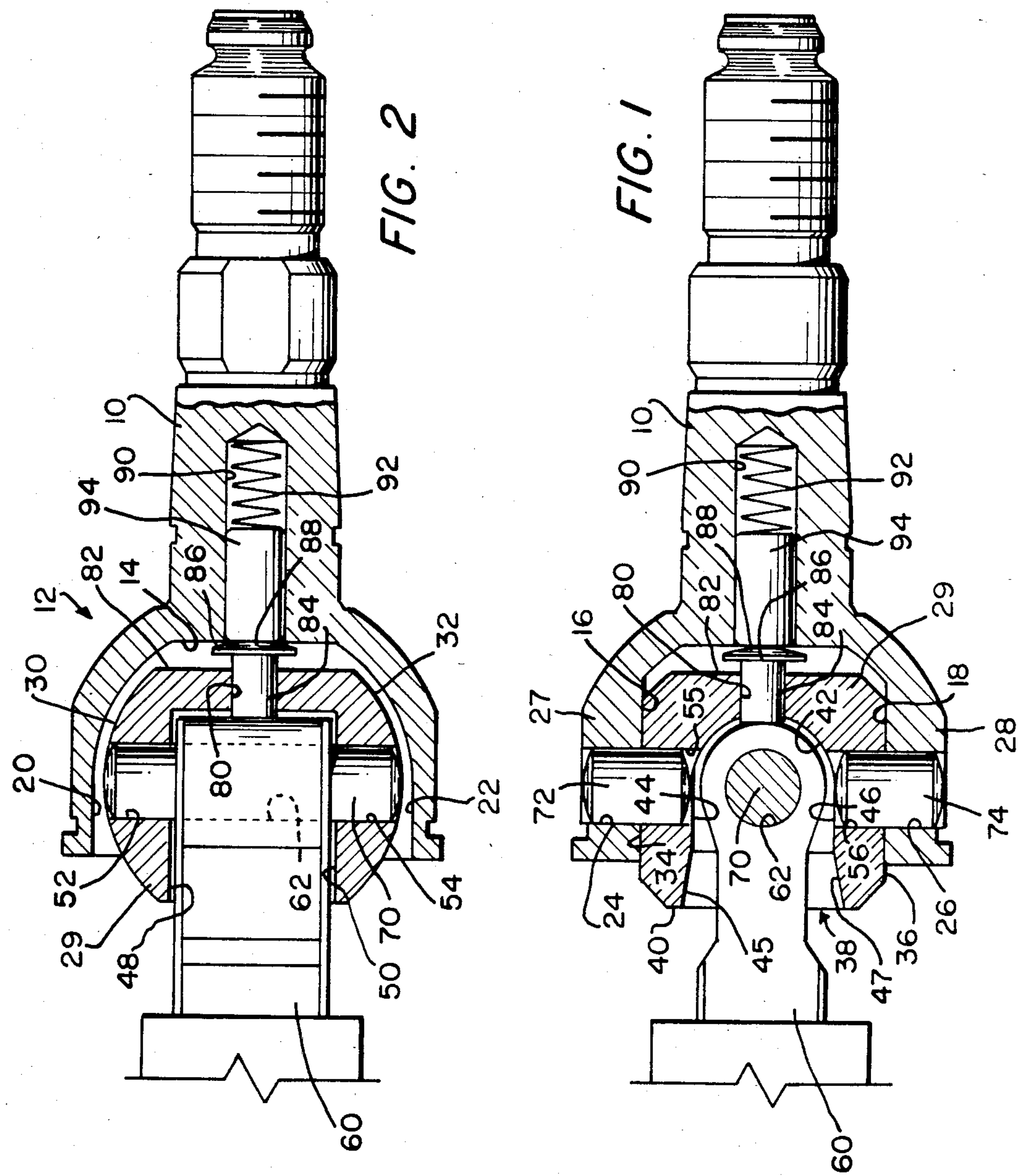

United States Patent [19]

Pastor

[11] Patent Number: 4,579,546

[45] **Date of Patent: * Apr. 1, 1986**

[54] PRELOADED DRIVE ASSEMBLY

[75] Inventor: William Pastor, Torrington, Conn.

[73] Assignee: The Torrington Company, Torrington, Conn.

[ * ] Notice: The portion of the term of this patent subsequent to Feb. 12, 2002 has been disclaimed.

[21] Appl. No.: 628,860

[22] Filed: Jul. 9, 1984

Related U.S. Application Data

[63] Continuation-in-part of Ser. No. 474,152, Mar. 10, 1983, Pat. No. 4,498,888.

[51] Int. Cl.[4] .................. F16D 3/26

[52] U.S. Cl. .................. 464/112; 464/136

[58] Field of Search .................. 403/57, 58, 113, 114; 464/106, 112, 125, 134, 136, 150, 905

[56] References Cited

U.S. PATENT DOCUMENTS

| | | | |
|---|---|---|---|
| 105,696 | 7/1870 | Keller | 464/112 |
| 1,141,211 | 6/1915 | Prescott | 464/136 X |
| 1,216,508 | 2/1917 | Spade | 464/125 |
| 2,104,101 | 1/1938 | Rosenbaum | 464/112 |
| 2,211,388 | 8/1940 | Salvetti | 464/905 X |
| 2,271,974 | 2/1942 | Greiner | 464/125 |
| 2,293,717 | 8/1942 | Dodge | 464/905 X |
| 2,499,569 | 3/1950 | Cooley | 464/136 |
| 2,997,864 | 8/1961 | Rueb | 464/112 |
| 3,064,453 | 11/1962 | Barsness et al. | 464/125 |
| 4,135,372 | 1/1979 | Benson | 464/112 X |
| 4,498,888 | 2/1985 | Pastor | 464/112 |

FOREIGN PATENT DOCUMENTS

| | | | |
|---|---|---|---|
| 313680 | 6/1929 | United Kingdom | 464/112 |

*Primary Examiner*—Stuart S. Levy
*Assistant Examiner*—Daniel P. Stodola
*Attorney, Agent, or Firm*—Frank S. Troidl

[57] ABSTRACT

The driving shaft has an end shaped to overlap the end of the driven shaft. The two shafts are interconnected by a coupling member. The coupling member is connected to the driven shaft by a long pin. The overlapping portion of the driving shaft is connected to the coupling member by two short pins. A preload spring mechanism applies preload forces against the two shafts.

5 Claims, 2 Drawing Figures

72 27 16 24 80 90 10 40 34 44 55 82 88 45 70 62 60 38 42 84 86 47 56 46 36 94 92 26 18 29 74 28

PRELOADED DRIVE ASSEMBLY

This is a Continuation-In-Part of application Ser. No. 474,152 filed Mar. 10, 1983, now U.S. Pat. No. 4,498,888.

This invention relates to universal joints. More particularly, this invention is a new preloaded vehicle drive assembly.

In most universal joints, torque is transmitted from one yoke to another through two perpendicular axes which pass through a hub. The hub may be made from metal or plastic and may range in geometry from square to spherical. As the universal joint rotates in other than a zero angle, it pivots on these two axes.

With use, wear may cause clearances or play between adjacent movable mechanical parts. For example, often the hub pivots about pivot pins arranged along the two perpendicular axes. As the universal joint is used, the pins begin to wear so that the pin diameter changes slightly and the apertures or holes in which the pins are mounted may also begin to wear, particularly if the hub is made of plastic. When such wear occurs, the universal joint operates too loosely and, of course, this is undesirable.

This invention is a simplified structure of universal joint which comprises a one piece specially shaped hub or coupling member which directly couples the driving shaft to the driven shaft, and a preload is applied directly against the driving shaft and the driven shaft to prevent excessive looseness.

Briefly described, the invention comprises a coupling member connecting together in an overlapping relationship, the end portions of driving and driven shafts. The coupling member has a slot in one side which receives the end portion of the driven shaft. A long pin is received in appropriate apertures in the coupling member. The pin extends across the slot and through an appropriate aperture in the driven shaft end portion. A pair of diametrically opposite short pins are received in appropriate apertures in the coupling member with their axes aligned and perpendicular to the axis of the long pin. Each short pin extends into an appropriate aperture of the driving shaft end portion. The coupling member also has a preload aperture located centrally and perpendicular to the intersection of the long pin and short pins axes and extending into the coupling member slot. A preload mechanism is in contact with the driving shaft and extends through the preload aperture into contact with the driven shaft to apply a preload directly against the driving shaft and the driven shaft to take up slack due to clearances or play between adjacent movable mechanical parts caused by wear.

The invention, as well as its many advantages, may be further understood by reference to the following detailed description and drawings in which:

FIG. 1 is a side view, partly in section, of a preferred embodiment of the invention; and FIG. 2 is a top view, partly in section, of the embodiment of FIG. 1.

In the various figures, like parts are referred to by like numbers.

Referring to the drawings, and more particularly to FIG. 1 and FIG. 2, the new drive assembly includes a drive shaft 10 wich has an approximately bell-shaped end 12. The inside surface of the bell-shaped end portion 12 is formed by a back wall 14, top and bottom straight walls 16 and 18, respectively, and curved side walls 20 and 22 (see FIG. 2).

Aligned top and bottom apertures 24 and 26, respectively, extend perpendicularly through the top 27 and bottom 28, respectively, of the bell-shaped end 12.

The coupling member 29 is received within the bell-shaped end portion 12 of the drive shaft 10. The coupling member is provided with two diametrically opposite curved side surfaces 30 and 32 (see FIG. 2) which are adjacent the curved surfaces 20 and 22 of the bell-shaped end portion 12. The coupling member 29 also has top and bottom annular flat surfaces 34 and 36, respectively, which abut the straight inside surface portions 16 and 18, respectively, of the bell-shaped end portion 12 of the drive shaft 10.

A slot 38 is provided in the front face 40 of the coupling member 29. The front face 40 faces away from the bell-shaped end portion 12 of the drive shaft 10. The slot 38 is formed by a curved rear surface 42, top and bottom flat surfaces 44 and 46, and side flat surfaces 48 and 50 (see FIG. 2). Extending from the top and bottom flat surfaces 44 and 46, are surfaces 45 and 47, respectively, which are inclined outwardly from flat surfaces 44 and 46, respectively.

Aligned side apertures 52 and 54 are centrally located in the side curved surfaces of the coupling member 29 and extend perpendicularly through the coupling member into the slot 38. Coupling member 29 also has a top aperture 55 and a bottom aperture 56 aligned with apertures 24 and 26, respectively, in the bell-shaped end portion of drive shaft 10. Top aperture 55 and bottom aperture 56 are shown extending into the slot 38. However, if desired top aperture 55 and bottom aperture 56 may terminate short of slot 38. The axes of all the apertures in the coupling member 29 and the bell-shaped end portion 12 of the drive shaft 10 meet at a common point. This prevents the shafts from acting wobbly due to rotational velocity changes from one axis to another axis.

A driven shaft 60 has one end thereof received in the coupling member slot 38. The end of the driven shaft 60 is curved at its extreme end to conform with the curved back wall 42 of the slot 38. The thickness of the driven shaft 60 adjacent the inclined surfaces 45 and 47 of the slot 38 is such that drive shaft 10 and coupling member 29 are permitted limited upward and downward pivotal movement with respect to driven shaft 60.

The curved extreme end portion of the driven shaft 60 is provided with a transverse aperture 62 which is aligned with the side apertures 52 and 54 of the coupling member 29.

A long pin 70 is received in the coupling member side apertures 52 and 54. The long pin 70 extends across the slot 38 and through the driven shaft aperture 62. Short pins 72 and 74 are received in the top aperture 24 and bottom aperture 26, respectively, of the bell-shaped portion 12 of driving shaft 10. Each short pin 72 and 74 also extends into the apertures 55 and 56, respectively, of the coupling member 29.

As the drive assembly is used there is a tendency for the pins 70, 72, and 74 to become worn so that their diameters decrease slightly at different points. Also there is a tendency for the apertures 24, 26, 52, 54, and 62 to become worn. In addition other adjacent movable mechanical parts may become worn. The result of all this wearing is that the pins begin to fit much too loosely in the apertures. Therefore, it is highly desirable that a preload be applied to the two shafts to keep the movement from becoming too loose even though the pins and/or apertures and/or other adjacent movable mechanical parts become worn.

To provide for the preloading, a preload aperture 80 is located centrally in the back surface 82 of the coupling member 29. The preload aperture 80 extends through the coupling member 29 and into the back section of the slot 38. Aperture 80 is perpendicular to the intersection of the axis of long pin 70 and the aligned axes of short pins 72 and 74.

A preload mechanism is in contact with the driving shaft 10 and extends through the preload aperture 80 into contact with the driven shaft end portion to apply a preload directly against the driving shaft 10 and the driven shaft 60. The preload mechanism includes a plunger 84 of a diameter small enough to insure a sliding fit inserted into the preload aperture 80 prior to the assembly of the long pin 70 and the short pins 72 and 74. The plunger 84 has a flanged head 86 with the top of the head having a spherical radius 88.

An axial counterbore 90 having its axis aligned with the axis of aperture 80 in the coupling member 29 is machined into the drive shaft 10. A coil spring 92 is located in the deepest portion of the counterbore 90 and serves to maintain the preload. A cylindrical plunger 94 of a diameter small enough to insure a sliding fit is inserted into the counterbore 90 and contacts the preloading coil spring 92. The final assembly of the coupling member 29 and the shafts 10 and 60 causes the flanged plunger 84 to engage plunger 94 to initiate the preload. The coil spring 92 pushes against the drive shaft 10 toward the right looking at FIG. 1 and FIG. 2. The coil spring 92 also exerts a force through cylindrical plunger 94, through flanged plunger 84, and against the end portion of the driven shaft 60 to push the driven shaft 60 toward the left, looking at FIG. 1 and FIG. 2. Thus the preload has the effect of tending to push the shafts 10 and 16 away from one another to take up slack due to clearances or play between adjacent movable mechanical parts caused by wear.

The coupling member 29 may be made from either metal or plastic. This new drive assembly may be used for the same purposes as any other U-Joint arrangement. However, one use for which this drive assembly is particularly suited is with a vehicle driving wheel column where the driving wheel may be tilted to be more comfortable for the driver. In such case, the wheel will be attached to the top of the shaft 10 and the inclined surfaces 45 and 47 of the slot 38 may extend at an angle of, say 15 degrees, to the axis of the shaft 10. This would provide a limited amount of tilt of the driving wheel with respect to the driven shaft 60. The drive shaft 10 and coupling member 29 may be pivoted a limited amount about the long pin 70. The spherical radius head 88 of the flanged plunger 84 serves to insure smooth operation of the drive assembly coupling throughout its operational range.

I claim:

1. A drive assembly for a vehicle driving wheel column with a tiltable driving wheel comprising: a driving wheel shaft having an approximately bell-shaped end portion, the inside surface of the bell-shaped end portion having two diametrically opposite curved side surfaces and two diametrically opposite flat top and bottom surfaces; a driven shaft; a solid coupling member received within said bell-shaped end portion and connecting together the driving wheel shaft and the driven shaft; the coupling member having curved side surfaces adjacent and spaced from the curved side inside surfaces of the bell-shaped end portion of the driving wheel shaft, top and bottom flat surfaces adjacent and touching the flat inside surfaces of the bell-shaped end portion of the driving wheel shaft and a slot on one side and receiving in said slot the end portion of the driven shaft the surfaces forming said slot being shaped to permit limited upward or downward pivotal movement, only of the coupling member with respect to the driven shaft; a long pin received in appropriate apertures in the coupling member, said pin extending across the slot and through an appropriate aperture in the driven shaft end portion; and a pair of diametrically opposite short pins received in appropriate apertures in the coupling member with their axes aligned and perpendicular to the axis of the long pin, each short pin also extending into an appropriate aperture in the bell-shaped end portion, whereby the driving wheel shaft and the coupling member, as a unit, may be pivoted a limited amount about the long pin; the solid coupling member being completely solid except for said slot and said apertures in the coupling member; said coupling member also having a preload aperture located centrally and perpendicular to the intersection of the long pin and short pins axes and extending into the coupling member slot; and a preload mechanism contacting the driving wheel shaft and extending through the preload aperture into contact with the driven shaft end portion.

2. A drive assembly in accordance with claim 1 wherein: the preload mechanism includes a preload spring.

3. A drive assembly in accordance with claim 2 wherein: the preload mechanism also includes a coupling member plunger extending through the preload aperture, the drive member has an axial counterbore, and the preload spring is a coil spring located in said axial counterbore to spring bias the plunger against the driven shaft end portion.

4. A drive assembly in accordance with claim 3 wherein: the coil spring is located in the deepest portion of the counterbore, and a cylindrical drive shaft plunger is located in the counterbore and biased by the coil spring against the head of the coupling member plunger.

5. A drive assembly in accordance with claim 4 wherein: the surfaces forming the coupling member slot are shaped to permit limited pivotal movement about the long pin, and the coupling member plunger has a spherical radius head.

* * * * *